Nov. 10, 1953
W. VOGEL
2,658,618
SEPARATION OF SOLID MATERIALS OF
DIFFERENT SPECIFIC GRAVITIES
Filed April 26, 1950
4 Sheets-Sheet 1
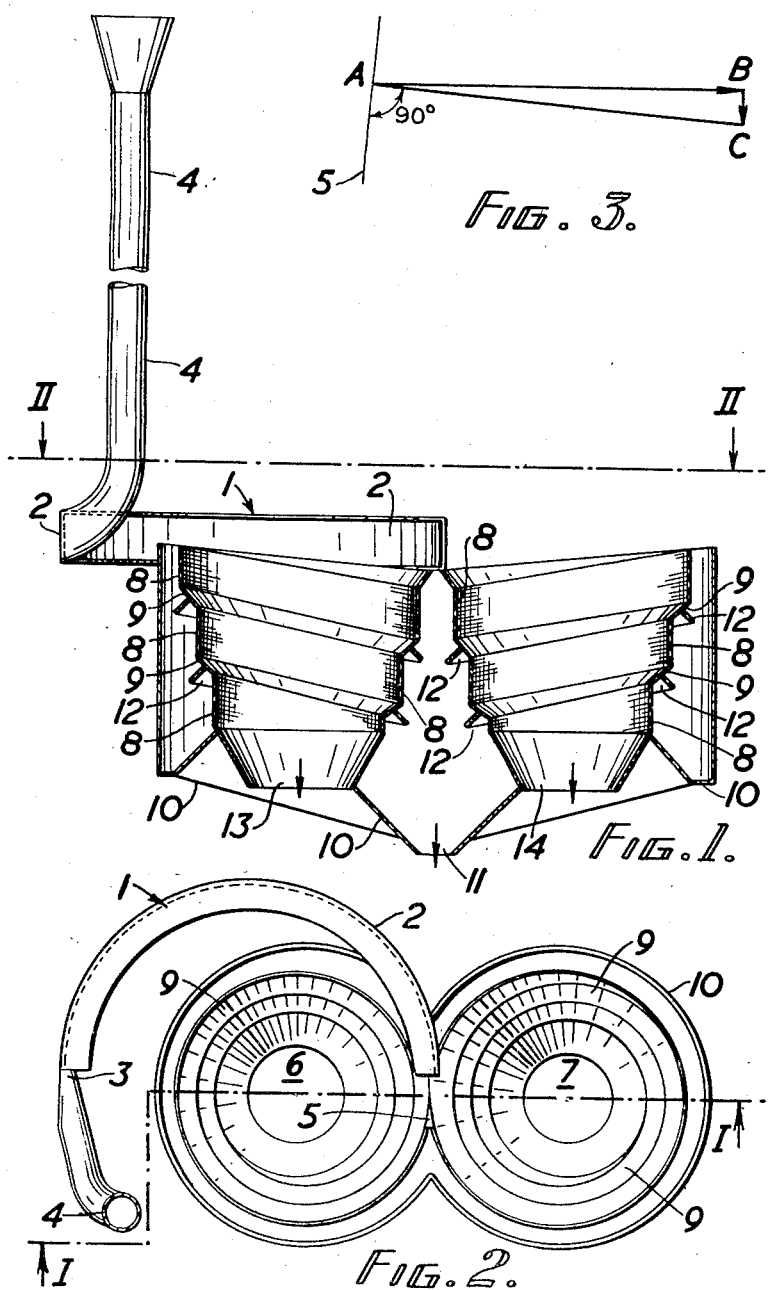
Inventor
WALTER VOGEL
By [signature]
Attorney Nov. 10, 1953     W. VOGEL     2,658,618
SEPARATION OF SOLID MATERIALS OF
DIFFERENT SPECIFIC GRAVITIES Filed April 26, 1950     4 Sheets-Sheet 2

Inventor
WALTER VOGEL
By    *[signature]*
Attorney

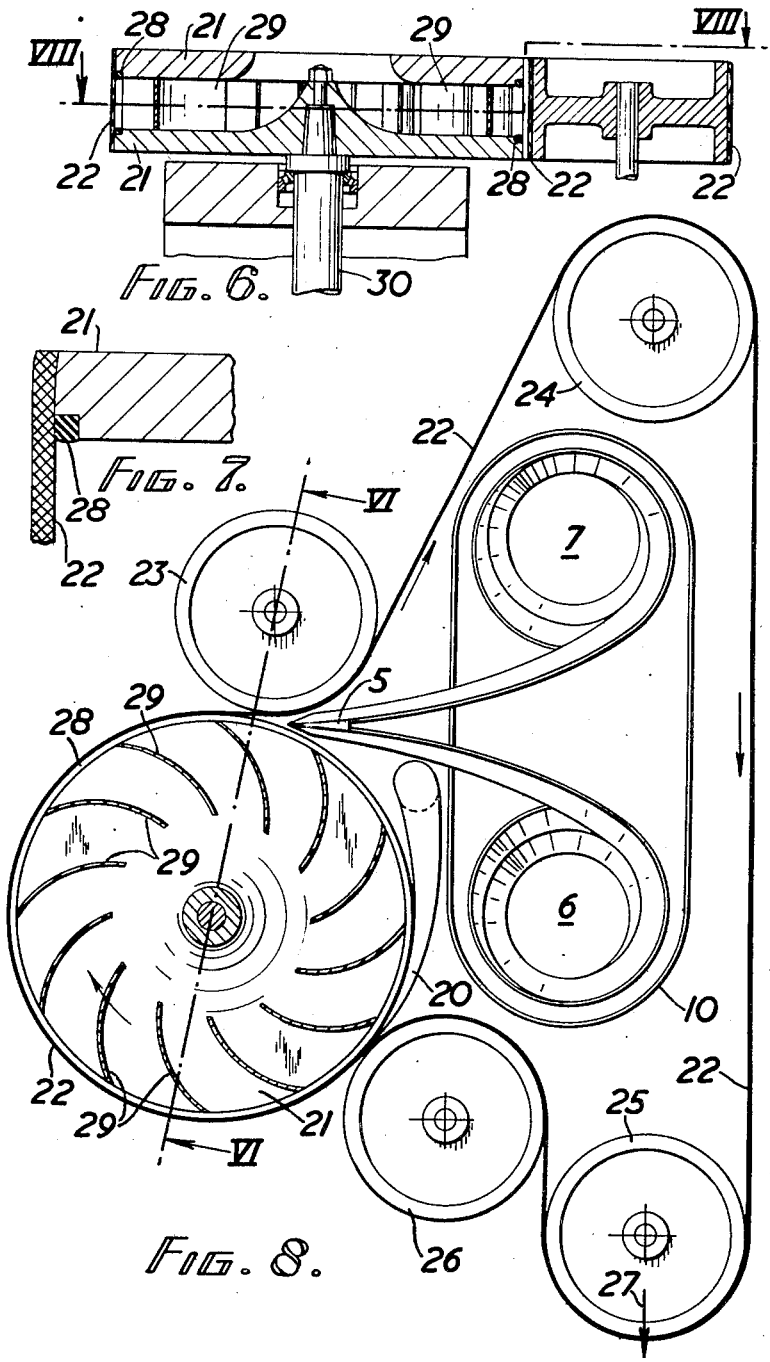

Nov. 10, 1953   W. VOGEL   2,658,618
SEPARATION OF SOLID MATERIALS OF
DIFFERENT SPECIFIC GRAVITIES
Filed April 26, 1950   4 Sheets-Sheet 4

Inventor
WALTER VOGEL
By [signature]
Attorney

Patented Nov. 10, 1953

2,658,618

UNITED STATES PATENT OFFICE 2,658,618

SEPARATION OF SOLID MATERIALS OF DIFFERENT SPECIFIC GRAVITIES

Walter Vogel, London, England

Application April 26, 1950, Serial No. 158,118

Claims priority, application Great Britain July 14, 1949

11 Claims. (Cl. 209—173)

This invention relates to the separation of solid materials of different specific gravities by a float and sink process using a so-called heavy liquid, separation being effected under the influence of centrifugal force. The heavy liquid consists of a suspension of finely divided solid material in a true liquid, the suspension having a density intermediate those of the solid materials to be separated.

In the processes of this character which have previously been proposed a mixture of heavy liquid with the materials to be separated is fed tangentially into a vessel of circular cross section where the mixture is subjected to centrifugal force and the separated fractions move apart axially of this vessel, the floats going in one direction and the sinks in the opposite direction, each with a part of the heavy liquid. According to one such proposal, the centrifugal separation is effected in a cyclone, that is a stationary vessel of conical form, while according to another proposal the centrifugal separator has a rotary casing against the inner surface of which a spiral conveyor rotates about the axis of rotation of the casing but at a different speed.

According to the present invention, instead of effecting the centrifugal separation in a closed centrifugal field by feeding the mixture into a vessel which is circumferentially closed and causing the two fractions to flow axially apart, separation is effected in an interrupted centrifugal field, the mixture being fed in tangentially at one point and discharged tangentially at another point, the outlet stream being divided by a blade or equivalent device along an equipotential line of the separating field. The apparatus for effecting separation in accordance with the invention may take many forms, some of which are shown by way of example in the accompanying drawings. In these drawings, which are of a somewhat diagrammatic character:

Figure 1 is a vertical section, taken on the line I—I of Figure 2 through one form of the apparatus;

Figure 2 is a horizontal section, taken on the line II—II of Figure 1 through this form of the apparatus;

Figure 3 is a vector diagram showing the disposition of the dividing blade;

Figure 6 is a vertical section, taken on the line VI—VI of Figure 8, through a third form of the apparatus;

Figure 7 shows a detail of Figure 6 upon an enlarged scale;

Figure 8 is a horizontal section, taken on the line VIII—VIII of Figure 6, through this third form of the apparatus;

Figure 4:
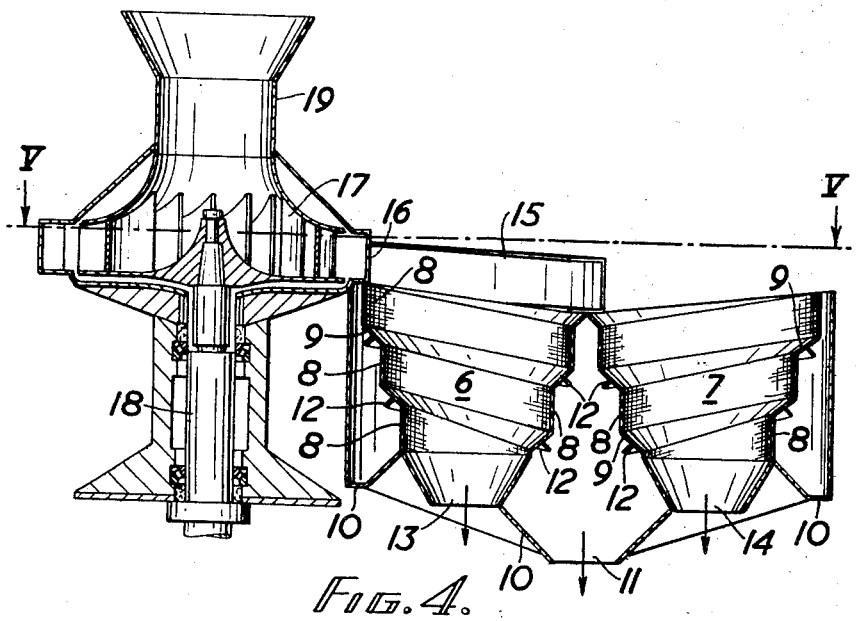
Figure 4 is a vertical section, taken on the line IV—IV of Figure 5, through a second form of the apparatus.

In the construction shown in Figures 1 and 2 the mixture of the heavy liquid with the materials to be separated is fed at high speed into one end of a nearly horizontal channel section trough 1, which follows a curved path, the base 2 of the trough being on the outside of the curve. The mixture is delivered into the trough at high speed by forcing it under pressure through a jet nozzle 3, to which the trough is directly connected and of which it forms a smooth continuation. The speed of flow required to effect satisfactory separation will generally be 15 meters per second or more. In the construction illustrated, the required pressure is obtained by feeding the heavy liquid and the materials to be separated into the upper end of a vertical pipe 4 whose height corresponds to the pressure necessary on the jet in order to obtain the desired velocity. The stream leaving the other end of the trough is divided into a fraction containing the sinks and another fraction containing the floats by a blade 5 disposed along an equipotential line of the separating field produced by the combined effect of gravity and of the centrifugal force due to the curvature of the trough. The disposition of the blade 5 will be clear from the diagram of Figure 3, in which the vector AB represents the horizontally directed centrifugal force and the vector BC represents the vertical force of gravity. The resultant field is thus represented by the vector AC and the blade 5 is disposed perpendicular thereto.

The stream leaves the trough 1 at high speed and centrifugal force may therefore be conveniently applied for assisting the separation of the solid materials from the heavy liquid. Immediately after being divided by the blades, each of the two part streams is directed tangentially against a curved sieve or filter wall which retains the solid material while permitting the heavy liquid to pass through. The two sieves are preferably disposed side by side and arranged to deflect the two part streams outwardly in opposite directions so that in each case the separated material fraction lies on the side of the part stream furthest from the sieve wall, thus facilitating the passage through that wall of the heavy liquid portion of the stream. In the construction illustrated, the sieve or filter 6 for the inner part stream containing the floats is precisely similar to the sieve or filter 7 for the outer part stream containing the sinks, except that it is of opposite hand. Each of them comprises a substantially vertical filter wall 8 which slopes downwardly and is curved in a spiral of progressively decreasing radius, forming a helix, and an imperforate guide wall 9, extending between adjacent turns of the filter wall to form with it a substantially conical vessel. The heavy liquid passing through the filter walls is collected by a casing 10 surrounding the conical filter and is discharged at 11. A baffle 12 projecting outwardly from the wall 9 deflects the heavy liquid passing through the filter wall away from lower turns of that wall. The floats, or lighter fraction of the materials to be separated, are discharged at 13 at the apex of filter 6 and the sinks, or heavier fraction are similarly discharged at 14.

In the apparatus of Figures 1 and 2, the trough or channel 1 in which the stream is subjected to the action of centrifugal force follows a circular curve and turns through an angle of about 180°. The separating effect obtained is substantially determined by the total angle through which the stream is deflected and where large separating effects are required the channel may be curved through a total angle many times that shown. In such cases the channel may follow a spiral path, a logarithmic spiral being suitable. If the channel lies in a horizontal plane, the speed of the stream will be gradually decreased by friction with the walls of the trough and the depth of the stream will consequently increase towards the outlet end of the channel. The depth of the stream may be kept constant by giving the channel a vertical gradient, so that it follows a helical path, the gradient being chosen to compensate as exactly as possible for the energy lost by friction.

Figure 5:
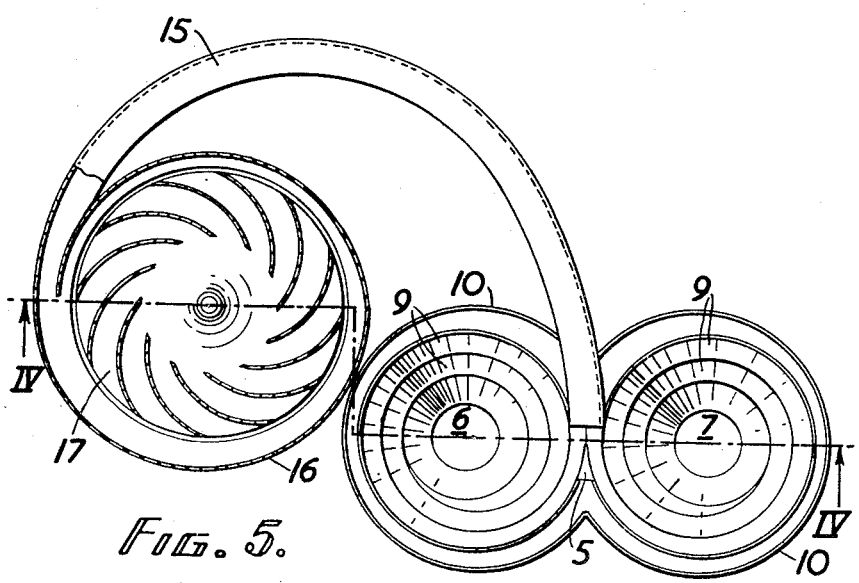
Figure 5 is a horizontal section, taken on the line V—V of Figure 4, through this second form of the apparatus.

Instead of producing the required high speed by means of a pressure jet, the heavy liquid and the materials to be separated being raised to the height required to produce this pressure, a centrifugal pump may be employed. This solution is employed in the form of apparatus shown in Figures 4 and 5. In this apparatus, the trough or channel 15, in which separation is effected forms a spiral continuation of the casing 16 of the pump 17, whose rotor is mounted on a vertical driven shaft 18. The separation of the mixture fed into the inlet 19 of the pump begins in the pump itself and is continued without interruption as the stream flows through the length of the channel 15 to the tangential outlet, in front of which the stream dividing blade 5 is disposed in the manner already described with reference to Figures 1 to 3. The arrangement of the sieves or filters 6 and 7 is also as described. The channel 15 follows a logarithmic spiral path and slopes down from inlet end to outlet end to compensate for friction.

The forms of construction shown in Figures 1 to 5 may be employed in cases where the friction of the sinks against the base of the trough or the outer wall of the channel is of little consequence. Where the effect of such friction would be important, the separating channel itself may travel in the same direction as the stream and preferably at as nearly as possible the same speed. Such a travelling channel may be formed by a pair of parallel rotating discs mounted on a common shaft and an endless belt which engages the edges of the discs over a part of their peripheries and closes the space between them. The part of the belt not in engagement with the discs passes around suitably disposed pulleys to one of which a tensioning force is applied so as to ensure that the belt will be pressed into sealing engagement with the discs. To improve the seal obtained, the peripheries of the discs may carry sealing members of rubber or other elastic material. At the point where the belt leaves the discs tangentially, a blade or other device for dividing the stream is provided. Figures 6 to 10 show two forms of apparatus embodying such an arrangement.

In the apparatus of Figures 6 to 8 the stream of heavy liquid and material to be separated is delivered through a jet nozzle 20 tangentially into one end of the part circular channel formed between the discs 21 and bounded externally by belt 22. While it remains between the discs the stream has the same velocity as the belt and it leaves the belt tangentially when the latter goes around the pulley 23. At this point is disposed the blade 5 separating the part of the stream containing the floats from the part containing the sinks. The blade 5 and the sieves or filters 6 and 7 are again disposed and arranged as described with reference to Figures 1 to 3. The belt 22 is guided by a system of pulleys, 23, 24, 25 and 26 so arranged as to give the space required to accommodate the filters. One of these pulleys 25 is provided with means urging it in the direction of the arrow 27, so as to maintain taut the belt 22. In order to improve the seal between the belt 22 and the edges of the discs 21, the latter carry rubber rings 28 as best shown in Figure 7. Between the discs 21 there extend fan blades 29, producing an air current which gives better stability conditions of the stream. The discs 21 are mounted on a vertical axle 30 which is carried in bearings disposed on one side only of the belt and the pulleys 23, 24, 25 and 26 are similarly supported. Removal and replacement of the belt is thereby facilitated.

Figure 9:
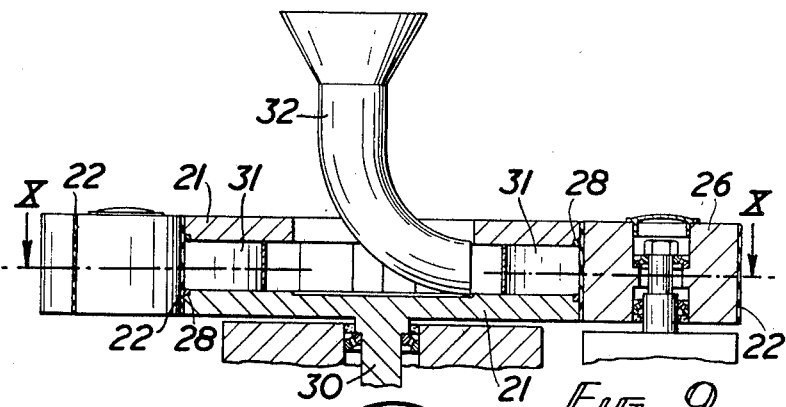
Figure 9 is a vertical section, taken on the line IX—IX of Figure 10, through a fourth form of the apparatus
Figure 10:
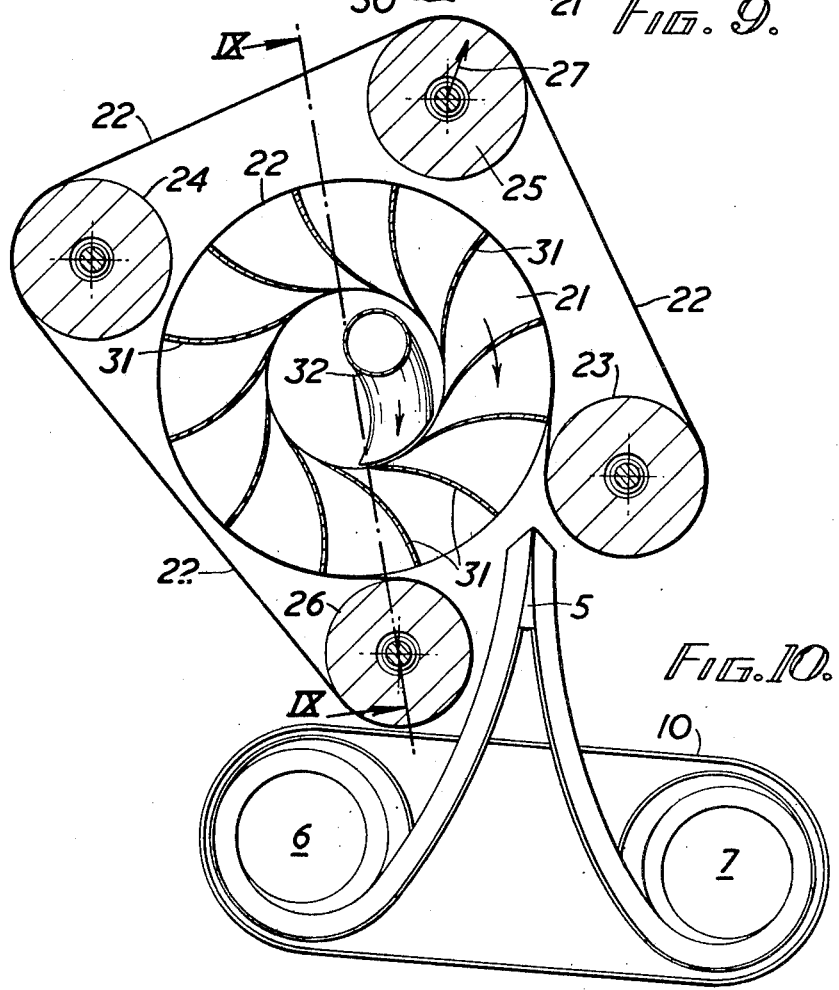
Figure 10 is a horizontal section, taken on the line X—X of Figure 9, through this fourth form of the apparatus.

The form of apparatus shown in Figures 9 and 10 generally similar to that of Figures 6 to 8 except that (as in the apparatus of Figures 4 and 5) the stream is projected into the channel at the required speed by a centrifugal pump instead of by a pressure jet. In this case the blades 31 disposed between the discs 21 extend outwardly to the belt. The heavy liquid and the materials to be separated are fed through an inlet 32 to the inner edges of the blades 31 at a point so chosen that the stream flung out by the blades reaches the outside periphery at the point where the belt first comes into contact with the discs. Since it is not necessary in this appartaus to provide space for the mounting of the jet nozzle 20 used in Figures 6 to 8, the belt can surround the discs for three quarters of their circumference. As shown the belt 22 returns on the side of the discs 21 remote from the filters 6 and 7, the pulleys 24, 25 being disposed on the rear side of the discs but alternatively the belt may encircle the filters, as in the apparatus of Figures 6 to 8.

What I claim is:

1. In an apparatus for separating solid discrete particles of different specific gravities by a sink and float process involving the use of a heavy liquid formed by solid discrete particles suspended in a liquid, the density of the suspension being intermediate to that of the particles to be separated, the improvements comprising a guide member including a passage way in form of an open curve and having an inlet and an outlet end, pressure means for projecting tangentially into the inlet end of said passage way a continuous stream of a mixture of said particles to be separated and said heavy liquid for generating centrifugal field forces by the velocity of said stream and the curvature of said open passage way, thereby forming within said stream during the passage thereof through said passage way an outer part containing the denser portion of the solid particles and some of the liquid and an inner part containing the less dense of the solid particles and the remainder of the liquid, separating means disposed adjacent to the outlet end of said passage way for dividing the stream into said outer part and said inner part, and filtering means for separately filtering each of said parts to separate the solid particles contained therein from the liquid.

2. An apparatus as defined in claim 1, wherein said guide member comprises a stationarily mounted trough forming an open curve.

3. An apparatus as defined in claim 1, wherein said guide member is mounted for curvilinear movement substantially corresponding to the curvature of the passage way in said guide member, the said member being adapted to be moved with a velocity approximately equal to the velocity of the stream fed into said passage way.

4. An apparatus as defined in claim 3, wherein said guide member comprises a pair of discs mounted in spaced parallel relationship for rotation about a common center axis, and a flexible belt enveloping a portion of the peripheries of said discs in a cylinder like fashion so as to form said open curved passage way between the two discs, the inlet and outlet end of the passage way being respectively at the points at which said belt engages and leaves the discs.

5. An apparatus as defined in claim 4, wherein a plurality of pulley means guide the belt to and away from the discs and tension the belt.

6. An apparatus as defined in claim 1, wherein said separating means comprise a blade shaped element stationarily disposed adjacent to the outlet end of said passage way substantially in alignment with the equipotential line of said centrifugal field of force.

7. An apparatus as defined in claim 1, wherein said pressure means comprise a stationarily mounted nozzle positioned to direct said stream tangentially into the inlet end of the passage way.

8. An apparatus as defined in claim 1, wherein said pressure means comprise a centrifugal pressure pump including a rotor disposed within a casing, the pressure outlet of said pump communicating tangentially with the inlet end of said curved passage way, said pump casing having a curvature forming a smooth continuation of the curvature of the passage way.

9. An apparatus as defined in claim 1, wherein said guide member comprises a pair of discs mounted in spaced parallel relationship for rotation about a common center axis, and a flexible belt enveloping a portion of the peripheries of said discs in a cylinder like fashion so as to form said open curved passage way between the two discs, the inlet and outlet end of the passage way being respectively at the points at which said belt engages and leaves the discs, and wherein said pressure means comprise a centrifugal pressure pump including a rotor disposed within a casing, said rotor including a plurality of substantially radially disposed blades extending between said two discs.

10. An apparatus as defined in claim 1, wherein said filtering means include two curved filter walls, and wherein said curve passage way, said separating means and said filter walls are disposed in a positional relationship so as to direct each part of the divided stream tangentially against a respective one of said filter walls, whereby the said walls retain the solid particles while passing the liquid.

11. An apparatus as defined in claim 10, wherein the said two filter walls are oppositely curved and positioned so as to deflect the two parts of the stream away from one another, whereby the solid particles contained in each part stream are collected on the side of each part stream furthest from the respective filter wall.

WALTER VOGEL.

References Cited in the file of this patent

UNITED STATES PATENTS

| Number | Name | Date |
|---|---|---|
| 629,596 | Pardee | July 25, 1899 |
| 1,456,934 | Rice | May 29, 1923 |
| 1,922,489 | Mercier | Aug. 15, 1933 |
| 2,106,532 | Lockett et al. | Jan. 25, 1938 |
| 2,109,121 | Thorold | Feb. 22, 1938 |
| 2,109,234 | Keenan | Feb. 22, 1938 |
| 2,272,005 | Hudson | Feb. 3, 1942 |
| 2,431,559 | Humphreys | Nov. 25, 1947 |

FOREIGN PATENTS

| Number | Country | Date |
|---|---|---|
| 791,194 | France | Dec. 5, 1935 |
| 710/36 | Australia | Feb. 25, 1936 |